Oct. 17, 1961 K. H. BRAUDORN 3,004,578
TIRE TREADS
Filed June 3, 1960 2 Sheets-Sheet 1
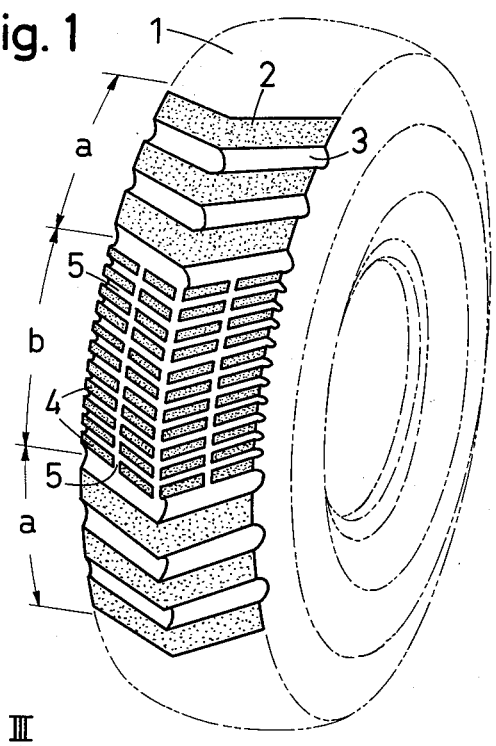
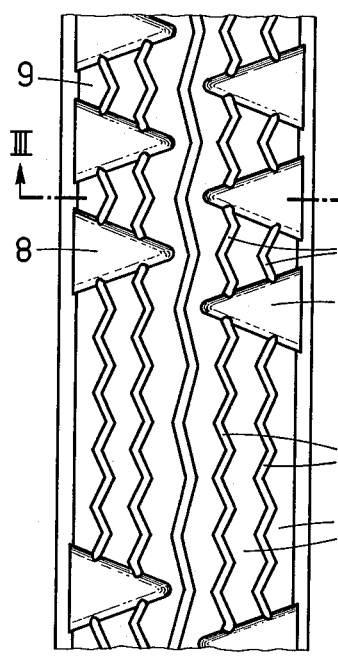
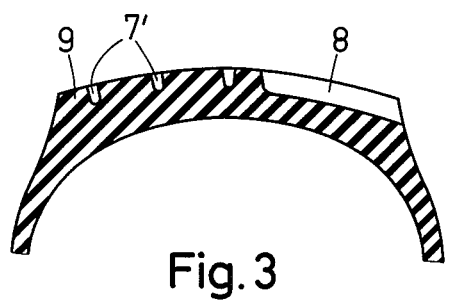
INVENTOR.
KARL HEINZ BRAUDORN
BY: Toulmin & Toulmin
Attorneys Oct. 17, 1961     K. H. BRAUDORN     3,004,578
TIRE TREADS
Filed June 3, 1960     2 Sheets-Sheet 2
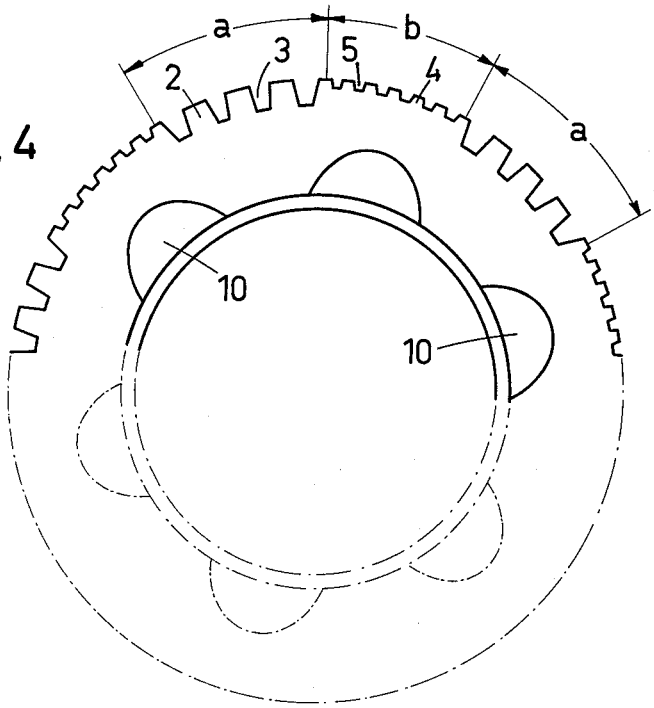
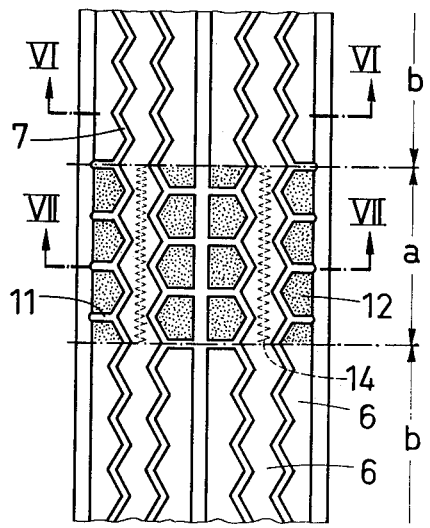
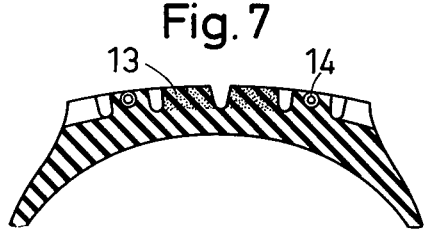
INVENTOR
KARL HEINZ BRAUDORN
BY Toulmin & Toulmin
Attorneys

United States Patent Office 3,004,578
Patented Oct. 17, 1961

3,004,578
TIRE TREADS
Karl H. Braudorn, Hannover, Germany, assignor to Continental Gummi-Werke Aktiengesellschaft, Hannover, Germany
Filed June 3, 1960, Ser. No. 33,685
5 Claims. (Cl. 152—209)

The present invention relates to treads for vehicle tires, more particularly to vehicle tires having a plurality of different treads on the running surface thereof, which treads are suitable for different types of roads.

While previous tires have been provided with different types of treads, these treads are spaced laterally of each other on the running surface of the tire. Accordingly, the running surface has several circumferential bands, each of which has a different tread construction. As the tire rolls along a surface all of the different treads are effective at any one time at that point where the tire engages the surface.

The present invention also discloses a tire casing having different types of treads, which treads are suitable for different types of road conditions. In the present invention, however, these different treads are circumferentially positioned around the outer periphery of the tire casing so that when the tire rolls along a surface different treads become effective successively at the point where the tire casing engages the road surface. As an example, a coarse tread configuration is in engagement with the road followed by a tread having fine or wholly different configurations. Whenever the boundary between different treads engages the road surface it is apparent that two different types of treads will be effective concurrently. In addition, each different type of tread extends across substantially the width of the running surface of the tire casing. Accordingly, when a tire is rotating at an operating speed different tread sections will become successively effective and regardless of the road conditions the tread suitable for those conditions will be successively effective upon the road surface. Thus regardless of the road conditions, as a result of applicant's invention, a single tire will always present a tread which is favorable for those conditions.

The different treads are preferably positioned adjacent to each other; however, transition portions may be provided between the different treads. These transition portions can provide for a gradual change from one tread to another; for example, from a fine configuration to a rough configuration. It is also preferable that each different tread extend for approximately the same distance along the circumference of the tire casing. In addition circumferential extending grooves can be provided in addition to the different treads to improve the lateral stability of the tire as it rolls along the road.

It is, therefore, the principal object of this invention to provide a novel and improved tire which provides good traction under all road conditions.

It is another object of this invention to provide an arrangement of different treads on a tire casing wherein at any one time one tread is in engagement with the road surface.

Other objects and advantages of this invention will become apparent upon reference to the accompanying description when taken in conjunction with the following drawings wherein:

FIGURE 1 is a perspective view of a vehicle tire showing different treads thereon;

FIGURE 2 is a plan view of a tire tread showing a modification in the tread configuration;

FIGURE 3 is a sectional view taken along the line 3—3 of FIGURE 2;

FIGURE 4 is a side elevational view of a solid rubber tire illustrating recesses in the inner peripheral surface thereof;

FIGURE 5 is a plan view of a modified tread construction according to this invention;

FIGURE 6 is a sectional view taken along the line 6—6 of FIGURE 5; and

FIGURE 7 is a sectional view taken along the line 7—7 of FIGURE 5.

Returning now to the drawings, specific embodiments of the present invention will be described. There is illustrated in FIGURE 1 a tire casing having a tread 1 on the outer peripheral surface thereof. The tread 1 has two different tread configurations $a$ and $b$. The tread sections $a$ and $b$ are uniformly spaced circumferentially over the tire tread. The sections $a$ and $b$ are contiguous to each other and each extends an approximately equal distance circumferentially of the tire casing.

The tread section $a$ comprises substantially V-shaped blocks 2 which are separated from each other by deep V-shaped recesses 3. The blocks 2 and recesses 3 are positioned at a slight angle from the transverse direction across the tire casing.

The tread section $b$ has a plurality of ribs 4 which are considerably smaller than the blocks 2 and are separated from each other by transversely extending grooves and circumferentially extending grooves 5.

The tread or running surface of the tire, as illustrated in FIGURE 1, is particularly suitable for operation on hard roads and on soft and resilient surfaces, such as open fields. The tread sections $a$ are particularly effective upon soft ground and the sections $b$ on the hard surfaces.

In the modification of the invention as shown in FIGURES 2 and 3, the tread comprises a plurality of circumferential ribs 6, which are separated from each other by the circumferentially extending zig-zag grooves 7. A plurality of laterally extending recesses 8 which open on the outer edges of the tread periodically cross the circumferential ribs 6. The laterally extending portions 9 which are formed between the lateral recesses 8 are provided with grooves 7' which are substantially continuations of the grooves 7.

Proceeding next to FIGURE 4 there is shown a solid rubber tire constructed according to the present invention. The tread of this tire comprises the sections $a$ and $b$ in accordance with the modifications illustrated in FIGURE 1. In order to increase the effectiveness of the different tire treads a plurality of recesses 10 are provided in the sides or in the inner periphery of the annular body of the tire as shown in FIGURE 4. The recesses 10 are preferably positioned below the tread sections $b$ which are somewhat finer in configuration than the sections $a$. Accordingly, the recesses 10 will cause a depression of the section $b$ when the tread section $a$ engages the ground. This will improve the effectiveness of the tread sections $a$, as they successively follow the tread sections $b$ in engagement with the ground. This arrangement is of particular advantage when riding over soft ground, such as in open fields. This will greatly increase the traction obtained by the transverse ribs 2 in the tread sections $a$.

Proceeding next to FIGURES 5–7, the tread sections $a$ and $b$ illustrated therein have only small differences between them. As can be seen in FIGURE 5, circumferentially extending ribs 6 are separated by circumferentially extending grooves 7 which are zig-zag in shape. In section $a$ several of the circumferential ribs 7 are divided by transverse grooves 11 into blocks 12.

The different running or traction properties of tread sections $a$ and $b$ of FIGURE 5 are produced by hard substances embedded into the sections $a$. These hard substances which may be grains of Carborundum 13 are preferably vulcanized directly into the rubber comprising the tread as may be seen in FIGURE 7.

In addition, wire coils 14 may be embedded in a circumferential rib 6 which extends completely around the periphery of the tire casing. Both the hard grains 13 and the wire coils 14 will give greater protection against skidding on icy roads or on roads which are slippery because of substances such as oil thereon.

Thus it can be seen that the present invention provides an improved tire casing which includes a more effective arrangement of a plurality of different treads on a tire. While the shapes and configurations of the treads may be selected dependent upon particular road conditions the arrangement of the different tread sections will be similar to those described in the preceding modifications.

It will also be understood that this invention is susceptible to modification in order to adapt it to different usages and conditions, and, accordingly, it is desired to comprehend such modifications within this invention as may fall within the scope of the appended claims.

I claim:

1. A pneumatic tire comprising a casing, two different treads around the outer periphery of said casing, each of said treads extending over substantially the width of the outer periphery of said casing and being positioned circumferentially on said casing, one tread having narrow ribs and narrow grooves extending intermediate said narrow ribs, and the other tread having wide blocks and wide grooves extending intermediate said wide blocks, thereby making said tire suitable to attain ideal traction both on hard and soft surfaces.

2. A pneumatic tire as claimed in claim 1, wherein said ribs, blocks and grooves extend in a slight angle relative to the axis of rotation of said tire.

3. A pneumatic tire as claimed in claim 1, wherein the two treads alternate.

4. A pneumatic tire as claimed in claim 1, wherein each section of said two treads extends for substantially the same distance circumferentially of the tire casing.

5. A pneumatic tire comprising a casing, two different treads around the outer periphery of said casing, one of said treads having narrow ribs and the other of said treads having wide blocks, each of said treads extending over substantially the width of the outer periphery of said casing and being positioned circumferentially on said casing, said treads being arranged in sections in alternate order, each of said sections having substantially equal length, and recesses in the inner peripheral surface of said casing below the tread having narrow ribs, whereby the sections having narrow ribs are depressed in the area of said recesses upon engagement of the road surface, thereby increasing the traction of the tread having the wide blocks.

References Cited in the file of this patent

UNITED STATES PATENTS

| | | |
|---|---|---|
| 1,301,343 | Waterman | Apr. 22, 1919 |
| 1,383,818 | Kirby | July 5, 1921 |
| 1,412,744 | Hobson et al. | Apr. 11, 1922 |
| 2,240,542 | Bourdon | May 6, 1941 |
| 2,479,958 | Norman | Aug. 23, 1949 |
| 2,819,751 | Frary et al. | Jan. 14, 1958 |

FOREIGN PATENTS

| | | |
|---|---|---|
| 799,105 | France | Mar. 27, 1936 |